May 12, 1959

E. DAVIS ET AL 2,886,178

FILTER FOR DRY CLEANING SOLVENT AND VIBRATING
MEANS FOR BACKWASHING SAME

Filed July 28, 1952

INVENTOR.
ERNEST DAVIS &
RUSSELL D. McCALLUM
BY
John P. Murphy

May 12, 1959  E. DAVIS ET AL  2,886,178
FILTER FOR DRY CLEANING SOLVENT AND VIBRATING
MEANS FOR BACKWASHING SAME
Filed July 28, 1952  5 Sheets-Sheet 3
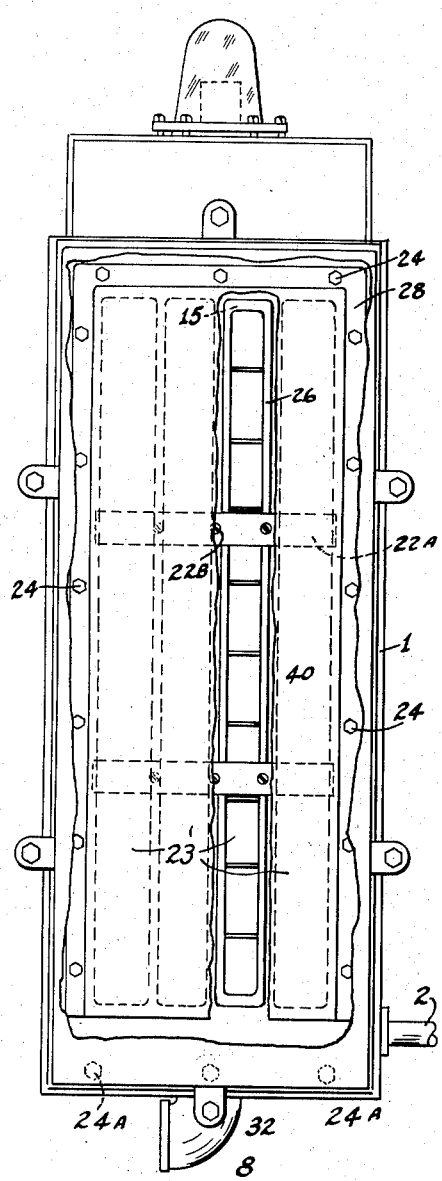
Fig. 3
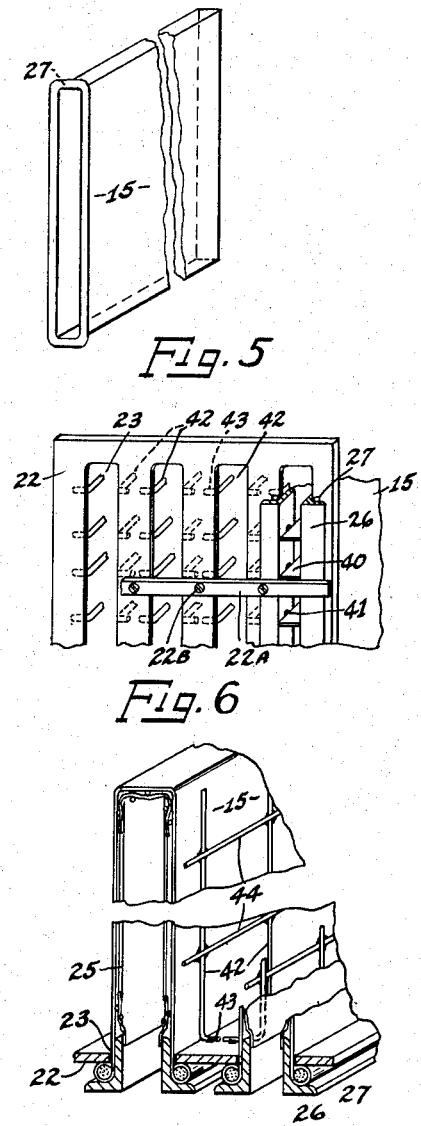
Fig. 5
Fig. 6
Fig. 4
INVENTOR.
ERNEST DAVIS &
RUSSELL D. McCALLUM
BY May 12, 1959     E. DAVIS ET AL     2,886,178
FILTER FOR DRY CLEANING SOLVENT AND VIBRATING
MEANS FOR BACKWASHING SAME
Filed July 28, 1952     5 Sheets-Sheet 4

INVENTOR.
ERNEST DAVIS &
RUSSELL D. McCALLUM
BY
John P. Murphy

United States Patent Office 2,886,178
Patented May 12, 1959

2,886,178

FILTER FOR DRY CLEANING SOLVENT AND VIBRATING MEANS FOR BACKWASHING SAME

Ernest Davis, Syracuse, N.Y., and Russell D. McCallum, Warren, Ohio, assignors, by mesne assignments, to Ward Industries Corporation, Syracuse, N.Y., a corporation of Delaware Application July 28, 1952, Serial No. 301,283

8 Claims. (Cl. 210—333)

This application is a continuation-in-part of our co-pending applications, Serial No. 143,712, filed on February 11, 1950, now abandoned, and Serial No. 214,484, filed on March 8, 1951, now abandoned.

This invention relates to a method and apparatus for filtering solvents such as are used in dry cleaning machines to remove dirt, grease, sludge, sediment and other matter that accumulates in the solvent and on the outside of the filter bags during the use thereof.

An object of this invention is to provide a process for rapidly and efficiently removing dirt, grease, sediment and other impurities from dry cleaning solvent which comprises passing the solvent through filter bags and intermittently applying fluid back pressure in the opposite direction onto said filter bags so as to remove such dirt, etc. from the filter bags, while simultaneously agitating said solvent and said filter bags so as to maintain the dirt, etc. in a dispersed, suspended state in said solvent, thereby removing all of the dirt when said solvent is withdrawn from contact with the filter bags.

Another object of this invention is an arrangement of the filter bags whereby during back-flowing operations the accumulation on the bags is quickly and efficiently removed.

A further object of the present invention is the provision of an arrangement of high frequency vibrators on the side walls of the filter bag compartment, whereby the vibrations are transferred through the fluid in a transverse direction against the side walls of the filter bags to dislodge, during back-flow operations, accumulated sediment including filter aid that is used in the solvent.

It also has for its object the construction and arrangement of the filter bags, and the means for holding them in position, and permitting the quick removal thereof when new bags are required.

It also has for its object features hereinafter referred to.

In describing this invention, reference is had to the accompanying drawings in which like characters designate corresponding parts in all the views.

Figure 3 is a front elevation, partly broken away, of parts seen in Figure 2, the cover of the casing being removed.

Figure 4 is an enlarged fragmentary sectional view showing the filter bags and the mounting in the supporting wall or partition.

Figure 5 is a fragmentary isometric view of one of the filter bags.

Figure 6 is a fragmentary elevation of the slotted plate or partition with the bags, except one, removed.

Figure 7 is a fragmentary side elevation of a filtering apparatus embodying this invention.

Figure 9 is an end elevation, looking to the right, of parts seen in Figure 8.

Figure 1:
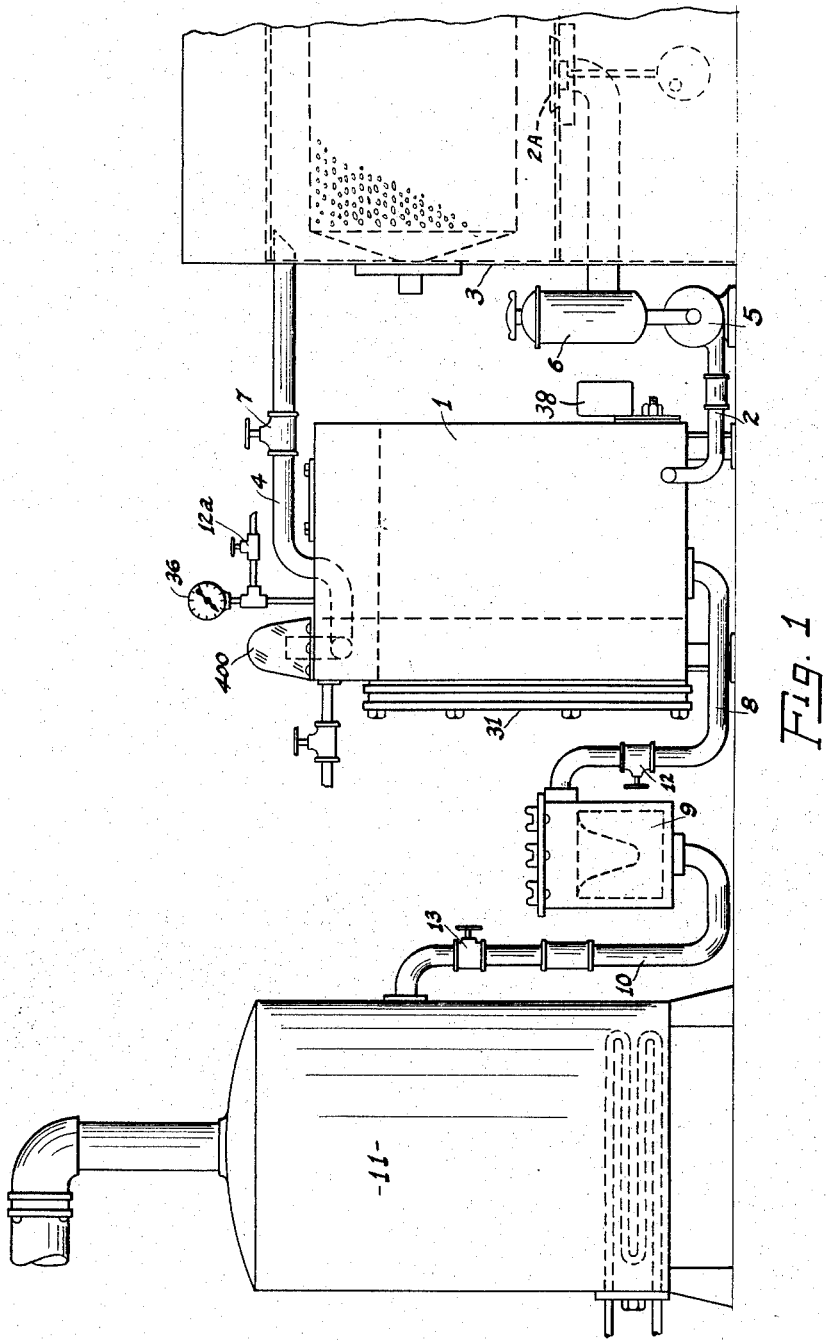
Figure 1 is a longitudinal elevation of a dry cleaning apparatus embodying the filter construction.

The filtering apparatus here shown is of the general type shown in co-pending application, Serial No. 143,712, filed February 11, 1950, and co-pending application, Serial No. 214,484, filed March 8, 1951.

The invention comprises generally a process for rapidly and efficiently removing dirt, grease, sediment and other impurities from dry cleaning solvent which comprises passing the solvent, which may be perchloroethylene or other solvent through filter bags and intermittently applying fluid back pressure in the opposite direction onto said filter bags so as to remove such dirt from the filter bags, while simultaneously agitating said solvent and said filter bags so as to maintain the dirt in a dispersed, suspended state in said solvent so that substantially all of the solvent's impurities are removed when said solvent is withdrawn from contact with the filter bags.

In addition the invention comprises generally a casing formed with a compartment in which upright filter bags are mounted spaced apart horizontally with their sides parallel to the upright lateral side walls of the filter bag compartment, the bags being open only at their like edges, as at their front ends, to permit a rapid flow of solvent from the bags and also to permit a rapid back flow of the solvent when air pressure is applied to back flow the solvent through the bags to remove the accumulated matter tending to clog the bags, and high frequency vibrators mounted in the upright lateral side walls of the filter compartment and opposed to the bags so that the vibrations are transferred in a general lateral direction through the solvent against the side walls of the bag, the vibrators being operated only during the back flowing operation.

The general purpose of the invention is a construction by which the bags can be quickly cleaned of accumulated sediment during back flowing operations which are performed when the dry cleaning machine, or washer, is idle while the machine is being loaded and unloaded, and a process whereby the solvent and bag are agitated so as to maintain the sludge, dirt, and other impurities in a dispersed suspension within the solvent, thus enabling the complete and efficient removal of the impurities when the solvent is drained from the filters into the subfilters for further processing. Thus the machine can be kept in continuous operation except while it is being loaded and unloaded, and time is not lost in the operation of the machine during the back flowing operations.

In the drawings 1 designates the casing of the filter, this having an inlet 2 leading from the outlet of the dry cleaning machine 3 and also having an outlet 4 leading back to the dry cleaning pump 5 and with an obstacle or button catcher 6. The outlet 4 has a suitable manually controlled valve 7 therein. The inlet 2 is controlled by the dump valve 2A of the dry cleaning machine. The casing 1 also has an outlet 8 leading from the lower part of the bag compartment thereof to a subfilter 9. The subfilter 9 has a valve controlled outlet 10 leading to a still 11. The outlet 8 is controlled by a manual valve 12, and the outlet 10 by a manual valve 13.

In the normal operation, the valves 12 and 13 are closed and the solvent, which may be perchloroethylene, circulates through the casing 1 from the inlet 2 back to the point of use through the outlet 4, the valve 7 of which is normally open.

The casing 1 is provided with a filter bag compartment 14 in which a series of bags 15 are supported in upright position and spaced apart horizontally. The bags 15 extend near, but spaced from, the bottom 16 of the bag compartment 14 to form an outlet chamber 17 for the solvent with the sludge therein, and the bags are also spaced apart from the top 18 of the compartment or chamber to provide an air space at 19 above the bags during the back-flow and filter bag cleaning operation.

Figure 2:
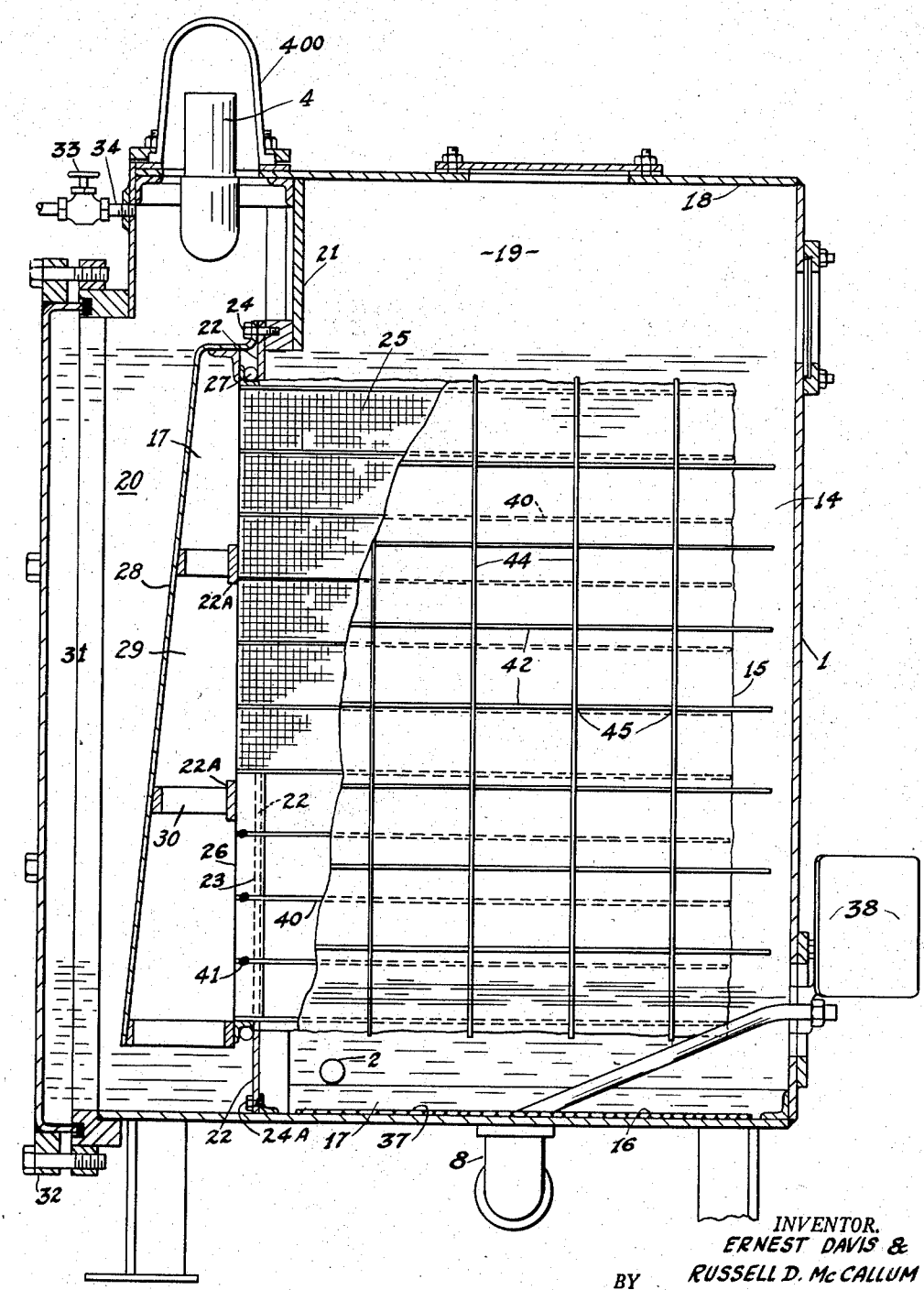
Figure 2 is an enlarged side elevation, partly in section and partly broken away, of the filter.
Figure 8:
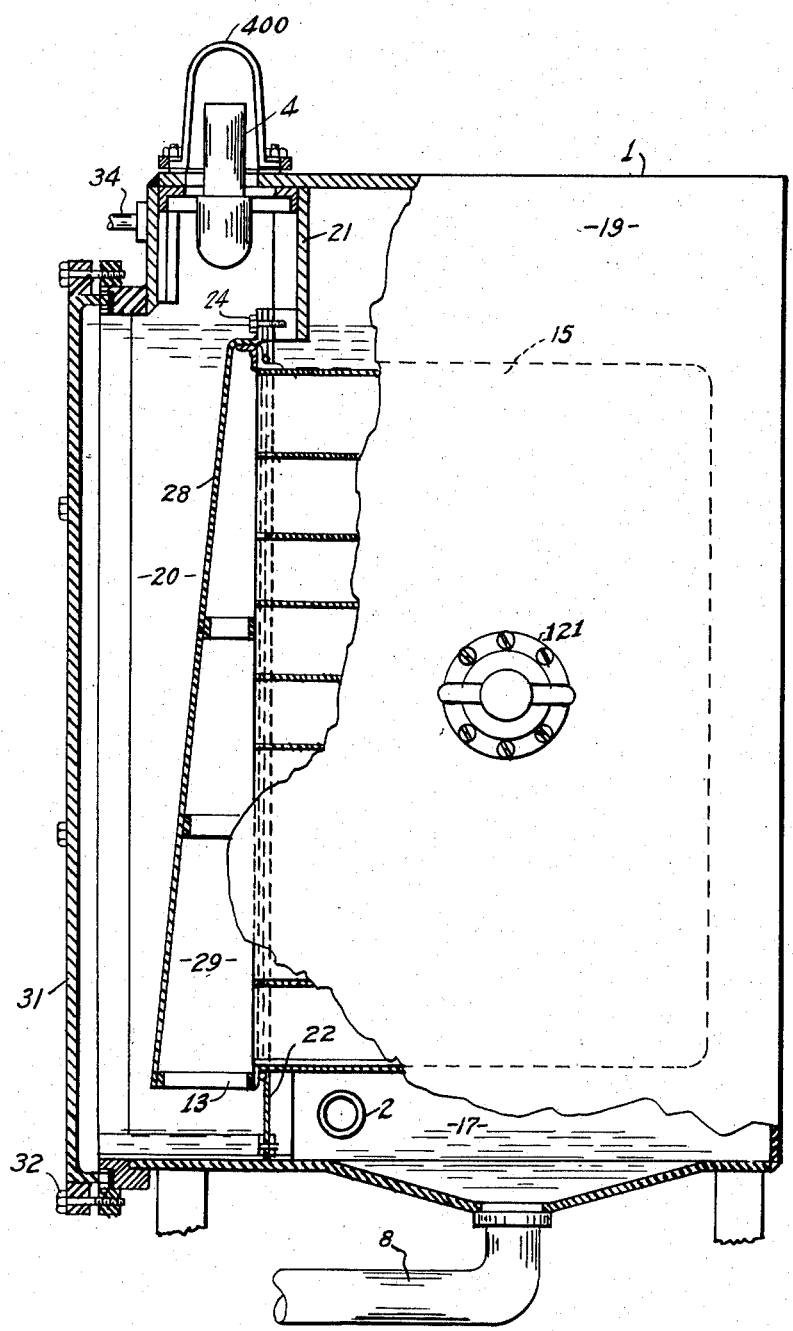
Figure 8 is an enlarged elevation of the filtering apparatus.

During the normal operation, the bag compartment is full of solvent, but during the back-flow operation the solvent is drained out of the level of the upper edges of the bags, or thereabouts, Figure 2. This is done by opening the valve 12 and a valve 12A to vent the top of the compartment 14.

The casing 1 is also formed with a transfer compartment 20 in front of the compartment 14. The upper part of the transfer compartment 20 is separated from the space 19 above the bags by an imperforate partition 21. The portion of the compartment 14 in which the bags are located is provided with a wall 22 formed with vertical slots 23, the wall 22 being secured at its margin to the body of the compartment 14 by fastening members 24, 24A.

The bags may be of any suitable construction and are usually formed of a fabric or a wire mesh reinforced by a fine wire mesh 25. The bags 15 are provided at their front ends with metal frames 26, angular or angle iron shape in cross section, Figure 4, like flanges of the angular formation being telescoped into slots 23, the other flanges of the angular formation being located to compress beads 27 at the open front ends of the bags between them and the margins of the walls around the slots 23.

The compartment 20 is provided with a baffle or partition 28 forming an upright passage 29 closed at its top and sides, and open only at its bottom, this baffle being located in front of and spaced apart from the open ends of the bags, or from the slotted wall 22. The baffle is secured at its margin to the margin of the wall 22 by the fastening members 24, except the three members 24A at the lower end of the wall 22, Figure 2. Suitable braces 30 are located between the baffle 28 and the slotted front wall 22. The braces press on the ends of the bars 22A extending transversely of the wall or partition 22 and pressing against the outer flanges of the angle iron frames 26 to press the frames 26 toward the margins of the walls around the slots 23 and compress the beads 27 of the bags between the outer flanges and the margins of the walls 22 around the slots 23. The bars 22A are secured intermediate of their ends to the wall 22 by screws 22B. The ends of the bars are unsecured to the wall 22 so that the braces can be removed from said wall and the bags with their frames 26 pulled out of the slots in the wall.

The compartment 20 is provided with a detachable front wall or cover 31 held in position by fastening members 32. It is obvious that upon removal of the cover 31, the fastening members 24 are accessible so that the baffle 28 and the bags are removable from the wall 22. If desired, by removing the three lower fastening members 24A along with the member 24, the front wall 22 and bags may be removed as a unit.

In the operation as thus far described, the solvent, which may be perchloroethylene, is forced by the pump 5 through the inlet 2 into the bag chamber 14 filling the same, and is forced through the bags 15 out through the open ends thereof against the baffle 28 into the chamber 20 and through the outlet 4 back to the dry cleaning machine 3, the sediment, filter aid which may be one of the diatomaceous earth filter aids, or any other suitable filter aid, such as Flo-Brite, etc., accumulating on the outer sides of the bag. It will be understood that the filter aid is thrown into the dry cleaning machine from time to time. The outlet pipe 4 has an upward vertical inlet extending into a sight glass 400 on the top of casing 1. Under the force of pump 5, the solvent rises in the chamber 20 into the sight glass 400 and overflows into the upstanding end of the pipe 4, thence through the pipe 4 into the machine 3. The upstanding end rises from a dip in the pipe 4, and the major part of the pipe 4, which is horizontal, is located on a level with the upper inlet end of the pipe 4 in the sight glass 400 so that the solvent overflowing into the upstanding end will flow through the major part of the pipe 4 horizontally to the machine.

In order to clean the matter accumulating on the bags, air pressure is supplied to the casing 1 through an air valve 33 in an inlet pipe 34 opening into the upper end of the compartment 20. During this operation, the outlet valve 7 is closed and also the dump valve 2A is closed. Preliminary to performing this operation, the valve 12 in the outlet pipe 8 is opened and air valve 12A in a vent pipe leading to the top of the bag compartment is opened, permitting atmospheric pressure to be applied to the solvent in the bag compartment, letting the solvent lower to the level of the tops of the bags. A pressure gauge 36 is also located in this vent opening between the valve and the chamber to indicate the air pressure so that it can be maintained at a definite point during the back-flowing operation. When the valve in the air pressure line is open, the air pressure on the solvent in the baffle chamber 20 forces the solvent downwardly and causes it to rise in the passage 29 and to press backwards through the bags, removing the accumulated matter on the bags so that such matter is carried to the lower part of the bag chamber 14 where it passes out through the outlet 8. A suitable agitator 37 is located in the lower part of the bag chamber 14, this being operated by an electric vibrator 38 at a suitable number of vibrations per minute to facilitate the removal of the solvent with the loosened solvent matter accumulating therein through the subfilter 9. It will be obvious to those skilled in the art that the selection of the suitable number of vibrations per minute will vary with the nature of the solvent, the type of sediment, filter aid, etc. In application to a dry cleaning machine it has been found that vibrations at the rate of between 200 and 400 per minute give satisfactory results.

In order to stiffen the bags 15 to prevent them from collapsing in the normal operation of the filter under the pressure of the solvent, which pressure is from the outside of the bags 15 to the inside, these bags are reinforced by horizontal metal strips secured, as by welding at 41, at their front ends to the frames 26. In order to prevent ballooning of the bags 15 during the back-flowing operation and holding them from pressing against each other and interfering with the removal of the sludge collected on the outer sides of the bags, spacers 42 are located between the bags. The spacers are shown as pairs of horizontal rods welded at their front ends at 43 to the partition 22 between the slots 23, one above the other, and also upright rods 44 intersecting the horizontal ribs and welded at 45 thereto.

Owing to the arrangement of the filter bags with their open front ends and the baffle 28, the flow of solvent is comparatively free in a forward direction in the normal use of the apparatus, and also during the back-flowing operation, due to the open front ends of the bags.

Owing to the mounting or supporting of the bags in the slotted front wall 22 of the bag compartment 14, and the assembly of the baffle and the frames 26 or gaskets for the open front ends of the bags, the bags are readily accessible for removal and replacement.

A feature of this invention is the use and location of high frequency vibrators 21 in the upright side walls 22 of the bag compartment 8 with the vibratable members 23 exposed in the compartment 8 and opposed to the side walls of the bags 7 so that the vibrations are transferred through the solvent in a general lateral direction against the side walls of the bags, and also around the bags to between the same against the opposing side walls of the bags. Usually there are but a few bags, as two, so that the bags are thoroughly shaken by the vibrations to dislodge the accumulated matter on the outside thereof in order that such matter can settle into the sludge sump. Thus, in operation with the valve 16 open and the valves 6 and 5A closed the vibrators, which are usually electrically operated, are energized by closing an electric circuit. Hence, the bags can be quickly cleaned during the back-flowing operation without interfering or taking time out to clean the bags while the washing machine is in operation, as the back-flowing operations are quickly performed during the time period it takes to load and unload the washing machine. This saving in time is due to the location of the high frequency vibrators 21. High frequency vibrators have heretofore been used in this type of machine but are located in the sludge sump to agitate the sludge in the sump to facilitate the flow of the sludge out through an outlet, as 17. These vibrations have very little, if any, effect on agitating the bags.

Although a specific embodiment of the invention has been shown for purposes of illustration, it is to be understood that the invention is capable of various uses and that changes and adaptations may be made therein as will be readily apparent to a person skilled in the art. The invention is only to be restricted in accordance with the scope of the following claims.

We claim:

1. A filter construction comprising a casing formed with a compartment for filter bags and having a valve controlled inlet for solvent in the lower part of the filter bag compartment, filter bags in the compartment spaced apart horizontally, the bags standing in upright position and having their front ends open, an upright baffle in the casing in front of the open ends of the bags and comprising a passage open only at its bottom, the casing having a valve controlled outlet from the top thereof in front of the baffle, and means for forcing the solvent through the inlet to the outside of the bags and through the bags and the open front ends thereof, around the lower end of the baffle, and through the outlet.

2. A filter construction comprising a casing formed with a compartment for filter bags and having a valve controlled inlet for solvent in the lower part of the filter bag compartment, filter bags in the compartment and spaced apart horizontally, the bags standing in upright position and having their front ends open, an upright baffle in the casing in front of the open ends of the bags and comprising a passage upon only at its bottom, the casing having a valve controlled outlet from the top thereof in front of the baffle, means for forcing the solvent through the inlet to the outside of the bags and through the bags and the open front ends thereof, around the lower end of the baffle, and through the outlet, means for applying air pressure to the inside of the casing in front of said baffle to back-flow the solvent down around the lower end of the baffle and upward into the bags through the open ends of the bags, and a second valve controlled outlet leading from the lower portion of the bag compartment.

3. A solvent filter construction comprising a casing formed with a filter bag compartment and a transfer compartment in front of the bag compartment, a wall between the compartments having upright slots, filter bags in the bag compartment open throughout their front ends and secured to their front ends only in the slots of said wall respectively and supported by said wall, a baffle supported by said wall in front of and spaced from the open ends of the bags and confining a passage closed at its front and lateral sides and open only at its lower end into the transfer compartment, fastening members detachably securing the slotted wall and the baffle in the casing, the casing having a valve controlled solvent inlet into the lower portion of the bag compartment, and a valve controlled outlet from the upper part of the transfer compartment.

4. A solvent filter construction comprising a casing formed with a filter bag compartment and a transfer compartment in front of the bag compartment, a wall between the compartments and having upright slots, frames, one for each bag, angular in cross section, one flange of the angular formation extending into one of the slots, the open end of each bag being sleeved on said flange and lapping the other flange of the angular formation, said other flange confronting the margin of the wall around the slot, a baffle in front of the slotted wall and having marginal flanges along its top and side edges lapping the margin of the slotted wall, the baffle confining a passage open only along its lower edge into the transfer compartment, fastening members common to the margins of the slotted wall and the baffle to support the baffle on the front wall of the bag compartment, cross bars carried by said wall on the front side thereof and extending crosswise of the outer flanges of said frames and extending transversely of the front wall, the cross bars being unsecured at their ends, the casing having a valve controlled solvent inlet into the lower portion of the bag compartment and a valve controlled outlet from the upper part of the transfer compartment.

5. A solvent filter construction comprising a casing formed with a filter bag compartment and a transfer compartment in front of the bag compartment, a wall between the compartments and having upright slots, frames, one for each bag, angular in cross section, one flange of the angular formation extending into one of the slots, the open end of each bag being sleeved on said flange and lapping the other flange of the angular formation, said other flange confronting the margin of the wall around the slot, a baffle in front of the slotted wall and having marginal flanges along its top and side edges lapping the margin of the slotted wall, the baffle confining a passage open only along its lower edge into the transfer compartment, fastening members common to the margins of the slotted wall and the baffle to support the baffle on the front wall of the bag compartment, cross bars carried by said wall on the front side thereof and extending crosswise of the outer flanges of said frames and extending transversely of the front wall, the cross bars being unsecured at their ends, the casing having a valve controlled solvent inlet into the lower portion of the bag compartment and a valve controlled outlet from the upper part of the transfer compartment, the transfer compartment having a detachable cover closing the front side thereof coextensive with the baffle for permitting the removal and the replacement of the baffle.

6. A filter construction comprising a casing formed with a filter bag compartment, upright filter bags spaced apart in the compartment and opening at like edges only through a wall of the compartment which separates the bag compartment from an outlet compartment, high frequency vibrators characterized by having vibrating members mounted in the side walls of the bag compartment and opposed and spaced from the upright bags, the casing having an inlet for the fluid opening into the bag compartment and an outlet for the fluid leading from the casing outside of the bag compartment, and also having means to back flow the fluid through the bags and the bag compartment, and a sludge outlet leading from the bag compartment below the bags.

7. A filter construction comprising a casing formed with a compartment for filter bags and having a valve controlled inlet for solvent to be filtered in the lower part of the filter bag compartment, filter bags in the compartment and spaced horizontally, the bags standing in upright position and having their front ends open, an upright baffle in the casing in front of the open ends of the bags and confining a passage open only at its bottom, the casing having a valve controlled outlet from the top thereof in front of the baffle, means for forcing the solvent through the inlet to the outside of the bags and through the bags and the open front ends thereof around the lower end of the baffle and through the outlet, a valve controlled conduit through which air pressure is applied to the inside of the casing in front of the baffle to back flow the solvent through the bags through the open front ends thereof, a second valve controlled sludge outlet from the lower bottom portion of the bag compartment; the high frequency vibrators characterized by being mounted in the upright lateral side walls of the bag compartment and having vibratable members exposed in the bag compartment and opposed to the lateral sides of the bags, whereby the vibrations are transmitted through the solvent against lateral sides of the bags to remove sediment therefrom during the back flowing operation.

8. A filter construction comprising a casing formed with a compartment for filter bags and having a valve controlled inlet for the solvent in the lower part of the bag compartment and an outlet for the fluid in the upper part of the casing outside of the bag compartment, upright filter bags in the bag compartment, the bags being open only at their upright front end into the casing outside of the bag compartment, the bag compartment also having a valve controlled sludge outlet from the lower part thereof, means for applying air pressure to the liquid fluid in the casing, said means communicating with the casing outside of the bag compartment, and high frequency vibrators characterized by being mounted in the upright lateral side walls of the bag compartment and having vibratable members exposed therein and opposed to the side walls of the bags, whereby during back flowing operations the vibrations of the vibrators are transferred to the liquid against the bags to dislodge accumulated sediment thereon.

References Cited in the file of this patent

UNITED STATES PATENTS

| | | |
|---|---|---|
| 1,144,854 | Lass | June 29, 1915 |
| 1,227,982 | Vallez | May 29, 1917 |
| 1,634,720 | Mills et al. | July 5, 1927 |
| 1,644,854 | Oliver | Oct. 11, 1927 |
| 1,734,999 | Cruickshank | Nov. 12, 1929 |
| 2,044,096 | Moran | June 16, 1936 |
| 2,366,903 | Harms et al. | Jan. 9, 1945 |
| 2,555,724 | Woody et al. | June 5, 1951 |
| 2,578,636 | Smith et al. | Dec. 11, 1951 |
| 2,650,872 | Goldwasser | Sept. 1, 1953 |

FOREIGN PATENTS

| | | |
|---|---|---|
| 1,780 | Great Britain | of 1893 |
| 429,820 | France | Oct. 2, 1911 |